United States Patent Office 3,525,602
Patented Aug. 25, 1970

3,525,602
PROCESS FOR PRODUCING SALT SUSPENSION FERTILIZERS
James E. Barker, Freehold, N.J., assignor to Cities Service Company, a corporation of Delaware
No Drawing. Continuation-in-part of application Ser. No. 583,074, Sept. 29, 1966. This application Aug. 11, 1969, Ser. No. 849,164
Int. Cl. C05b 1/00, 11/08
U.S. Cl. 71—40                                11 Claims

ABSTRACT OF THE DISCLOSURE

In a process for producing inverse ratio salt suspension fertilizers having potassium chloride in the amount of at least 5% expressed at $K_2O$, the improvement comprising incorporating a non-potassium sulfate salt in sufficient amount to prevent the formation of granules of potassium chloride on the order of about $+20$ mesh in size. Preferably the sulfate is incorporated in the amount as determined by the following formula:

Percent wgt. as $S = \frac{8}{33}(1.6 \times \%$ wgt. $K_2O$
$+ 0.18 \times \%$ wt. $P_2O_5 - 6.45)$ where $K_2O$ represents the amount of potassium chloride and $P_2O_5$ the amount of phosphate in the salt suspension fertilizer.

BACKGROUND OF THE INVENTION

This application is a continuation-in-part of my application Ser. No. 583,074 filed Sept. 29, 1966, now abandoned, and relates to a method of producing improved salt suspension fertilizers. More particularly, it relates to an improvement in the method of producing inverse ratio salt suspension fertilizers having a relatively high nitrogen content in the form of free aqueous ammonia.

Liquid fertilizers have increasingly come into commercial use because they allow for more efficient and economical handling and more effective application to the soil. However, because of the solubility characteristics of the dissolved ingredients, the plant nutrient composition of such liquid fertilizers is limited to about 30%. This adds to the cost of shipping and storing what is essentially non-nutrient liquid. Therefore, slurry or salt suspension fertilizers as they are referred to herein, have been developed in which an admixture of small particles of plant nutrient ingredients are suspended in the saturated fertilizer liquid, resulting in increasing the volumetric efficiency of the fertilizer. An added advantage of salt suspension fertilizers is that insoluble particles can be tolerated in the suspension thereby allowing the use of lower cost impure raw materials in the manufacture thereof.

The salt suspension fertilizer depends for its efficacy on its ability to retain the admixed particles in a suspended condition. Therefore, the presence of large particles or the continued growth of particles while in storage results in either part of the available plant nutrient settling out in the bottom of the storage tank and/or creates problems in handling and proper operation of conventional liquid fertilizer equipment.

Conventional salt suspension fertilizers generally contain nitrogen, phosphorus and potassium compounds as the primary plant nutrients. It is common to describe the various fertilizer grades in terms of the nitrogen (N), phosphorus (as $P_2O_5$) and potassium (as $K_2O$) content by weight either as a direct ratio of $N:P_2O_5:K_2O$ or as a percentage by weight of the fertilizer. The phosphorus content is expressed as phosphorus pentoxide ($P_2O_5$) while the potash component is expressed as potassium oxide ($K_2O$), though the actual salts are not the above oxides. For example a fertilizer described as a 4:3:3 or a 12–9–9 grade has a weight ratio of nitrogen to phosphorus pentoxide to potassium oxide of 4:3:3 even though all the potassium is in the form of potassium chloride. Similarly 12–9–9 represents the percentage by weight of the N-P-K components expressed as the percentage of the above salts in the indicated order in the whole fertilizer.

Phosphorus is included in the fertilizer as a phosphate, and is generally a mixture of several ammonium phosphate salts such as monoammonium phosphate, diammonium phosphate and triammonium phosphate trihydrate. The principal mineral source of phosphate is phosphate rock which is usually processed into either wet process phosphoric acid, superphosphate or triple superphosphate, each of which may be reacted with ammonia to obtain ammoniated phosphates. Ammoniated wet process phosphoric acid, and triple superphosphate are intended as starting materials for the process of the invention and contain either no or insignificant amounts of sulfate salts (i.e. below one percent sulfur which results when formulated in a fertilizer containing less than 0.3% wgt. sulfur).

To increase the amount of nitrogen nutrients in the fertilizer, ammonia being a relatively low cost material is therefore a preferred component. Therefore besides the ammonium salt content, free aqueous ammonia when included in a liquid or salt suspension fertilizer provides a means of adding nitrogen economically to the fertilizer. A salt suspension fertilizer having a concentration of between 10% and 20% by weight of aqueous ammonia is generally preferred, the upper limit being controlled by the atmospheric or storage conditions to prevent vapor loss of the ammonia. Salt suspension fertilizers having such a high concentration of nitrogen compounds relative to the phosphate content are known as inverse ratio fertilizers since the nitrogen content is higher than the phosphate content.

A problem which results from the presence of free aqueous ammonia in the salt suspension is the growth of potassium chloride granules to proportions generally a $+20$ mesh on the Tyler Scale. At this size, the granules tend to settle out of suspension and to create handling problems when used in conventional fertilizer equipment. Prior to the present invention, such salt suspension fertilizers having potassium chloride and free aqueous ammonia, were applied soon after manufacture. Where the fertilizers contained no free ammonia, it has been customary to use a clay such as attapulgite and/or bentonite in a pregel form to act as suspending agents. However these suspending agents are found to be of no benefit in the salt suspension fertilizers having free aqueous ammonia.

SUMMARY OF THE INVENTION

The invention is directed to an improvement in a process for producing high nitrogen salt suspension fertilizers by mixing aqueous ammonia, an ammoniated phosphate base material and potassium chloride wherein the amount of potassium chloride is at least 5% by weight of the fertilizer expressed as $K_2O$. The improvement comprises incorporating a non-potassium sulfate compound in the mixture in sufficient amount to prevent the formation of granules of potassium chloride on the order of $+20$ mesh on the Tyler Scale. Preferably the sulfate expressed as elemental sulfur is incorporated in an amount determined by the following formula:

Percent wgt. as $S = \frac{8}{33}(1.6 \times \%$ wgt. $K_2O$
$+ 0.18 \times \%$ wgt. $P_2O_5 - 6.45)$ where $K_2O$ represents the amount of potassium incorporated as potassium chloride, and $P_2O_5$ represents the amount of phosphate in the salt suspension fertilizer.

The present invention is based upon the discovery that the addition of an appropriate sulfate compound such as ammonium sulfate or calcium sulfate in the amount of at least 0.5% sulfur by weight to the salt suspension fertilizer acts to inhibit the growth of potassium chloride granules. It is thought that the basis for the action of the sulfate additive is as described by the following explanation. Ordinarily potassium sulfate ($K_2SO_4$) is less soluble than potassium chloride (KCl) in an aqueous solution. Where, as in the present case, the solution has a high free aqueous ammonia content, the potassium sulfate formed by the reaction of the ionized sulfate radical with potassium (chloride), precipitates out of solution as small particles which remain suspended. This allows for complete dissolution of the remaining potassuim chloride and thus also prevents the growth of potassium chloride granules in the salt suspension fertilizer.

Accordingly, it is an object of this invention to provide a novel process for making an improved salt suspension fertilizer having free aqueous ammonia.

Another object of this invention is to prevent the growth of potassium chloride granules in salt suspension fertilizers containing free aqueous ammonia.

These and other objects and advantages of the present invention will be apparent from the following description of the invention.

DESCRIPTION OF THE PREFERRED EMBODIMENTS

The preferred base material comprises an aqueous mixture having preferably little or no sulfate compounds, 8 to 25% nitrogen by weight, 24% to 40% phosphates ($P_2O_5$) by weight and less than 5% potassium by weight. This range includes materials having a 1:3:0 ratio and may include compositions with as little as 1% nitrogen by weight, in which the N and P components are soluble in water.

Any of various known methods for preparing a liquid fertilizer having a nitrogen and phosphorus content and low in sulfate may be used to obtain the base fertilizer solution. For instance either wet-process phosphoric acid or triple superphosphate may be ammoniated according to conventional methods. To such a base material, a soluble sulfate such as calcium sulfate, ammonium sulfate, or sulfuric acid is added to the fertilizer in the amount of at least 0.5% by weight expressed as elemental sulfur. Subsequently aqueous ammonia (to provide free ammonia in solution), and potassium chloride are added in proper proportions to make the desired final grade of fertilizer. The sulfate may be added at any time relative to the addition of the aqueous ammonia and potassium chloride components. Preferably the sulfate is added either before or during the addition of the aqueous ammonia and the potassium chloride.

The improved salt suspension fertilizer thus produced is a water base salt suspension having nitrogen in the form of aqueous ammonia and various nitrogen and ammonium salts, phosphorus in the form of phosphates, and potassium chloride as the primary plant nutrient constituents, with a sulfate content of at least 0.5% wgt. of the fertilizer with a content of from 0.5% to about 3.0% by weight sulfur being preferred. The upper limit of sulfate incorporation is dependent upon the amount of free ammonia available in the suspension fertilizer, and the necessity of maintaining formulation limits for the fertlizer.

The nitrogen component of the mixture is usually in the form of ammonium salts and aqueous ammonia, although urea and nitrates may be used to provide sources of supplemental nitrogen. The amount of nitrogen in the final salt suspension fertilizer composition is from about 8% to about 25% by weight and is in an equal or greater amount than the amount of phosphate expressed as $P_2O_5$.

The phosphate component is generally added as ammoniated triple-superphosphate, or ammoniated wet phosphoric acid. It is present in the final salt suspension fertilizer in the amount of at least 1% by weight and more preferably in the amount of from about 3% to about 17% expressed as $P_2O_5$ by weight of the salt suspension fertilizer.

The potassium component is added by using murite of potash, also denominated chemically as potassium chloride. Muriate of potash (KCl) is the specifically preferred potash additive of the salt suspension fertilizer in the present invention. When used, it is in the amount of from about 5% to about 17% expressed as $K_2O$ by weight of the fertilizer composition in the present invention.

The preferred suspension fertilizers produced according to the present invention have N-P-K ratio of 4:3:3 and are generally known as inverse ratio grades, having a relatively larger nitrogen content than the normal grades. Specific formulations produced according to the present invention are 12–9–9 and 16–12–12 grades. They are regarded as economically preferable because the relatively high nitrogen plant nutrient content is provided from the relatively inexpensive aqueous ammonia source.

Additional trace elements may also be added to the salt suspension fertilizer to provide for good plant growth, and are well-known (i.e., iron, magnesium, manganese, boron, zinc, etc.).

A base material for the salt suspension fertilizer composition may be prepared from diammonium phosphate and wet process phosphoric acid (WPA), in which the diammonium phosphate and wet process phosphoric acid are used in a mole ratio of 2 to 1, whereby the diammonium phosphate neutralizes the acid producing a mixture of monoammonium and diammonium phosphates in their most soluble proportions. The formula for the resulting base suspension is substantially 11–36–0, although different proportions may be prepared.

Another base material may be prepared by using diammonium phosphates and triple superphosphates in a weight ratio of 1.85 to 1. The diammonium phosphate neutralizes the triple superphosphate, producing a mixture of monoammonium, diammonium phosphates and dicalcium phosphate. A salt suspension formulation resulting from this process would have the formula, 7–28–0. Formulations having a higher nitrogen content may be made therefrom by the addition of supplemental nitrogen or ammonia.

Another base material for the salt suspension fertilizer of the present invention may be prepared from triple superphosphate and ammonia at the rate of 3.5 lbs. ammonia per unit of $P_2O_5$. The resulting formulation is characterized by a 5–20–0 grade formula.

The improved salt suspension fertilizer of the present invention is then prepared from the base material by adding free ammonia in the form of aqueous ammonia, and potassium chloride to obtain the desired plant nutrient content. The sulfate compound, either ammonium sulfate, calcium sulfate or sulfuric acid, is added to the above mixture in the amount of at least 0.5% with an amount of from 0.5% to about 3.0% by weight sulfur being preferred, the upper limit being dependent on the amount of free ammonia and the limits of the fertilizer formulation. The sulfate compound may be originally mixed with the base material or may be added prior to or simultaneously with the addition of aqueous ammonia and potassium chloride. The amount of soluble sulfate is preferably determined by employing the following equation:

$$\text{Percent wgt. } S = \frac{8}{33}(1.6\% \text{ wgt. } K_2O + 0.18\% \text{ wgt. } P_2O_5 - 6.45)$$

For instance when using ammonium sulfate as the source of sulfate the equation is Percent wgt. $(NH_4)_2 SO_4 = 1.6 \times \%$ wgt. $K_2O$
$+ 0.18 \times \%$ wgt. $P_2O_5 - 6.45$ The percent amount of ammonium sulfate preferred for a 12-9-9 grade salt suspension fertilizer is therefore determined to be about 9.57% wgt. While for this particular grade salt suspension fertilizer a lesser amount of ammonium sulfate has been found to yield satisfactory results, the equation is intended to be applicable to a wide range of environmental storage conditions. It is based on the amount of potassium chloride in the salt suspension fertilizer with which the sulfate reacts to form potassium sulfate which precipitates out and remains suspended. The percent weight phosphorus is also a factor in determining the amount of sulfate since in the free ammonia salt suspension fertilizer the phosphate is in the form of triammonium phosphate trihydrate and therefore effects the amount of water available for dissolution.

No added gel of attapulgite clay or other suspending agents need be used in the salt suspension fertilizers prepared according to the process of this invention. The addition of sulfate prevents the growth of large granules in the liquid aqueous ammonia suspension, thereby allowing for longer storage periods, and the advantages of using conventional liquid fertilizer application devices.

A salt suspension fertilizer may be conveniently prepared as follows. The basic starting materials are each determined and then the necessary amount of each starting material is calculated based upon the desired grade of fertilizer. The necessary amount of water is metered to a mixing tank and the sulfate and phosphates are added to the water to make a slurry. The slurry is then pumped through a grinder so that any granules are disintegrated. Meanwhile aqueous ammonia and potassium chloride in desired amounts are introduced into a second tank. The ground slurry of water, phosphates, and sulfate is then added to the second tank and the resultant mixture is agitated. Product is withdrawn from the second tank, pumped through a grinder and recirculated to the second tank until a homogenous mixture is obtained in the second tank. The resultant homogenous mixture is then transferred to a storage tank for subsequent use. It is to be understood that the aforementioned procedure can be readily adapted to continuous processing.

In order to give a fuller understanding of the present invention but with no intention to be limited thereon, the following specific examples are hereby given.

Example 1

A 12-9-9 grade salt suspension fertilizer having an ammonium sulfate content as shown in the following table is made by admixing water, 28% aqueous ammonia, -35 mesh diammonium phosphate, -30 mesh ammonium sulfate and -30 mesh potassium chloride, and added to the mixture in the above stated order. The salt suspension fertilizers were then stored under various conditions of temperature to promote granule formation for 14 days and the +20 mesh material in each sample was found to be as follows:

| Sulfur (S) percent | $(NH_4)_2 SO_4$ percent | +20 Mesh percent |
| --- | --- | --- |
| 0 | 0 | 9.4 |
| 0.8 | 3.3 | 5.6 |
| 1.6 | 6.6 | 2.3 |
| 2.4 | 9.9 | 0 |
| 3.2 | 13.2 | 0 |

As shown, with an amount of sulfate exceeding or equal to 2.4% by weight expressed as elemental sulfur the amount of +20 mesh material is negligible and measured as 0%.

Employing the equation described above for determining the amount of ammonium sulfate which should be added to the particular grade of inverse ratio salt suspension fertilizer of this example yields an indication of 9.6% ammonium sulfate or about 2.33% expressed as elemental sulfur. This amount clearly is within the range of sulfate addition necessary to minimize +20 mesh material as shown by actual results.

Example 2

Five tons of 16-8-8 salt suspension fertilizer was prepared as follows. 1,436 lbs. of water was metered into a mixing tank. 1,739 lbs. of a mixed monoammonium and diammonium phosphate base material analyzing as a 18-46-0 formulation and 779 lbs. of ammonium sulfate were then weighed into the tank and the resulting slurry was pumped through a grinder to disintegrate the granules. 4,713 lbs. of aqueous ammonia containing 1,131 lbs. of nitrogen and 1,333 lbs. of potassium chloride were metered into a second product mixing tank. The mixed base formulation, water and ammonium sulfate was added to the mixing tank, the whole mixture being agitated, pumped through a grinder and recycled until it was homogenous. It was then pumped to a storage tank. The final product therefore includes about 7.5% ammonium sulfate. After two weeks storage, no +20 mesh materials were observed, and this suspension fertilizer was successfully applied using conventional liquid fertilizer equipment.

Example 3

Three batches of 16-8-8 grade salt suspension fertilizers were prepared in the manner described in Example 2, but with differing percentages of ammonium sulfate, and observed for the appearance of +20 mesh particles after two weeks storage. Results were as follows:

| Sulfur (S) percent wgt. | $(NH_4)_2SO_2$ percent wgt. | +20 Mesh Material percent wgt. |
| --- | --- | --- |
| 0 | 0 | 8.2 |
| 1.21 | 5.0 | 2.3 |
| 1.94 | 8.0 | 0 |

The calculated amount of ammonium sulfate is 7.5% which is close to the amount of sulfate actually shown in this example to result in substantially no +20 mesh material.

Example 4

Three batches of a 12-6-15 grade salt suspension fertilizer were prepared with different inclusions of ammonium sulfate. The amount of +20 mesh material found in each of the batches after the two week storage was as follows:

| Sulfur (S) percent wgt. | $(NH_4)_2SO_2$ percent wgt. | +20 Mesh Material percent wgt. |
| --- | --- | --- |
| 0 | 0 | 15.0 |
| 2.42 | 10.0 | 7.0 |
| 4.85 | 20.0 | |

Calculations indicate that 19.6% wgt. ammonium sulfate would be required for this grade.

Example 5

The materials as described in Example 1 were admixed to formulate a 12-9-9 grade salt suspension. 7% ammonium sulfate or the equivalent of about 1.7% sulfur was added as the final ingredient. The salt suspension was then subjected to storage conditions somewhat milder than those of Example 1. After 14 days there was substantially no +20 mesh material.

Example 6

Sulfuric acid was admixed with -35 mesh diammonium phosphate, -30 mesh potassium chloride, 28% ammonia and water to formulate a 12-9-9 grade salt suspension fertilizer with a sulfate content equivalent to 7.0% $(NH_4)_2SO_4$. The salt suspension fertilizer was then subjected to storage conditions as specified in Example 5.

After 2 weeks there was substantially no +20 mesh material.

Example 7

Calcium sulfate in the form of gypsum ($CaSO_4 \cdot 2H_2O$) was admixed with −35 mesh diammonium phosphate, −30 mesh potassium chloride, 28% ammonia and water to formulate a 12–9–9 grade salt suspension fertilizer having a sulfate equivalent of 7.0% $(NH_4)_2SO_4$. The suspension fertilizer was subjected to the above-described storage conditions for 14 days, and essentially no +20 mesh material was formed.

The above description and details given in a form of examples are in no way to be regarded as limitations on the present invention, but are only illustrative thereof. Other modifications and equivalents of the invention will be apparent to those skilled in the art from the foregoing description.

I claim:

1. In a process for producing a high nitrogen salt suspension fertilizer by mixing aqueous ammonia, an ammoniated phosphate base material and potassium chloride wherein the amount of potassium chloride is at least 5% by weight of the fertilizer expressed as $K_2O$, the improvement comprising: incorporating a non-potassium sulfate compound in the mixture in sufficient amount to inhibit the growth of granules in said suspension fertilizer.

2. The process of claim 1 wherein the non-potassium sulfate compound is incorporated in the amount of at least 0.5% wgt. expressed as elemental sulfur.

3. The process of claim 1 wherein the non-potassium sulfate compound is incorporated in the amount at least equal to the percent by weight elemental sulfur according to the following equation:

$$\text{Percent wgt. } S = \frac{8}{33}(1.6 \times \% \text{ wgt. } K_2O + 0.18 \times \% \text{ wgt. } P_2O_5 - 6.45)$$

where $K_2O$ represents the amount of potassium and $P_2O_5$ represents the amount of phosphate in the salt suspension fertilizer.

4. The process according to claim 3 wherein said non-potassium sulfate compound is selected from the group consisting of ammonium sulfate, calcium sulfate, sulfuric acid, and mixtures thereof.

5. The process according to claim 3 wherein said non-potassium sulfate is ammonium sulfate.

6. The process according to claim 3 wherein said mixture of aqueous ammonia, ammoniated phosphate base material and potassium chloride is in the amount of from 8% to about 25% nitrogen, from about 3% to about 17% phosphorus expressed as $P_2O_5$ and from about 5% to about 17% potassium expressed as $K_2O$.

7. The process according to claim 6 wherein the mixture of aqueous ammonia, ammoniated phosphates and potassium chloride forms a salt suspension fertilizer having a nitrogen content in the amount at least equal to the amount of phosphates expressed as $P_2O_5$.

8. The process according to claim 6 wherein the non-potassium sulfate compound is incorporated in the mixture before the potassium chloride.

9. The process according to claim 6 wherein the non-potassium sulfate compound is incorporated in the mixture before the formation of +20 mesh granules of potassium chloride.

10. The process of claim 6 wherein the ammoniated phosphate base material contains less than 1% sulfate expressed as elemental sulfur.

11. The process according to claim 6 wherein the ammoniated phosphate base material is selected from the group consisting of monoammonium phosphate, diammonium phosphate, ammoniated phosphoric acid, ammoniated triple superphosphate and mixtures thereof.

References Cited

UNITED STATES PATENTS

| | | | |
|---|---|---|---|
| 2,770,538 | 11/1956 | Vierling | 71—40 X |
| 3,024,099 | 3/1962 | Martinson | 71—40 X |
| 3,234,005 | 2/1966 | Smalter | 71—53 X |

JAMES L. DE CESARE, Primary Examiner

U.S. Cl. X.R.

71—53